United States Patent [19]

Gimpel et al.

[11] 4,336,346
[45] Jun. 22, 1982

[54] COPOLYMERS CONTAINING BLOCKED ISOCYANATE GROUPS, AND THEIR USE IN ANODIC ELECTROCOATING

[75] Inventors: Juergen Gimpel; Karl-Heinz Feuerherd, both of Ludwigshafen; Hans-Uwe Schenck, Wachenheim, all of Fed. Rep. of Germany

[73] Assignee: BASF Aktiengesellschaft, Fed. Rep. of Germany

[21] Appl. No.: 252,802

[22] Filed: Apr. 10, 1981

[30] Foreign Application Priority Data

May 8, 1980 [DE] Fed. Rep. of Germany ....... 3017537

[51] Int. Cl.$^3$ .............................................. C08L 63/00
[52] U.S. Cl. ................................... 525/109; 525/110; 525/111; 525/528
[58] Field of Search ............... 525/111, 528, 110, 109; 260/29.6 NR, 23EP

[56] References Cited

U.S. PATENT DOCUMENTS 4,075,133 2/1978 Sekmakas et al.
4,085,161 4/1978 Sekmakas ........................... 525/528

FOREIGN PATENT DOCUMENTS 1947748 5/1970 Fed. Rep. of Germany.
2228642 1/1974 Fed. Rep. of Germany.
2924786 1/1981 Fed. Rep. of Germany.

OTHER PUBLICATIONS

Die Makromolekulare Chemie, 172 (1973), pp. 27–47.
Houben–Weyl: "Methoden der Organischen Chemie", vol. 14/2 (1963), pp. 61–70.
W. Machu: Elektrotauchlackierung", p. 163 (pp. 155–179).

Primary Examiner—Paul Lieberman
Attorney, Agent, or Firm—Keil & Witherspoon

[57] ABSTRACT

Surface-coating binders based on a copolymer which contains carboxyl groups, blocked isocyanate groups, hydroxyl groups and ether groups, and which, due to partial or complete salification with ammonia or with an organic base, is water-soluble or water-dispersible.

This copolymer contains, as copolymerized units, one or more $\alpha,\beta$-olefinically unsaturated carboxylic acids of 3 to 5 carbon atoms or one or more half-esters of an $\alpha,\beta$-olefinically unsaturated dicarboxylic acid of 3 to 5 carbon atoms, an N-(1-alkenyl) isocyanate blocked with a CH—, OH— or NH-acidic blocking agent, an adduct of an epoxy resin, based on bisphenol A and epichlorohydrin and having a molecular weight of from 380 to 3,500, with an olefinically unsaturated alcohol of 3 to 20 carbon atoms, and one or more other copolymerizable olefinically unsaturated compounds, and has a mean molecular weight of from 1,000 to 20,000 and an acid number of from 35 to 150 mg of KOH/g.

The novel surface-coating binder is useful for the anodic electrocoating of metallic articles.

8 Claims, No Drawings

COPOLYMERS CONTAINING BLOCKED ISOCYANATE GROUPS, AND THEIR USE IN ANODIC ELECTROCOATING

The present invention relates to surface-coating binders based on a copolymer which contains carboxyl groups, blocked isocyanate groups, hydroxyl groups and ether groups, and to their use in electrocoating finishes.

Electrocoating binders based on polyethers are described in German Published Application DAS No. 2,228,642. There epoxy resins based on bisphenol A are reacted with vinyl alcohols, hydroxyethyl vinyl thioethers or hydroxyalkyl acrylates, and these products are then copolymerized with acrylates. Since the resulting modified epoxy resins still have epoxide values of from 0.08 to 0.11, the stability of baths containing the electrocoating compositions obtained is not entirely satisfactory at low throughputs.

Electrocoating binders based on polyethers are also described in U.S. Pat. No. 4,075,133. There epoxy resins based on bisphenol A are reacted with additional bisphenol A and allyl glycidyl ethers or only with allyl alcohol. The resulting allyl-containing products are then copolymerized with other monomers.

Electrocoating binders based on epoxy resins which are derived from bisphenol A and carry allyl groups are also described in German Published Application DAS No. 1,947,748. However, these binders do not contain any crosslinkable groups other than the carboxyl groups. To improve the leveling and gloss of the surface-coating films, it is necessary to reduce the molecular weight of the copolymers. In the case of the binders of German Published Application DAS No. 1,947,748 this leads to a deterioration of the mechanical properties and of the resistance to chemicals. It is also inadvisable to employ the copolymers of German Published Application DAS No. 1,947,748 as sole binders for electrocoating compositions, since the surface-coating properties are unsatisfactory.

Electrocoating binders, which contain blocked vinyl isocyanate as a comonomer, are proposed in German Patent Application P No. 29 24 786.7. However, the anti-corrosion properties afforded by the corresponding electrocoating compositions are not fully satisfactory.

It is an object of the present invention to provide surface-coating binders, in particular for electrocoating compositions, which contain a defined amount of blocked isocyanate groups which are directly bonded to the carbon chain of the polymer, whilst the polymer molecule may or may not additionally contain other reactive groups so that the polymers may be employed as self-crosslinking binders or as binders which need an external crosslinking agent. It is a further object of the invention to provide binders which have better anti-corrosion properties than the binders proposed in German Patent Application P No. 29 24 786.7.

We have found that this object is achieved, surprisingly, by providing polymers which in addition to the blocked vinyl isocyanate contain the amount of carboxyl groups necessary for anionic electrocoating compositions, without the blocked isocyanate, under the polymerization conditions, undergoing very substantial rearrangement and hydrolysis, as described in the literature (Makromol. Chem. 172 (1973), 27–47). The incorporation of adducts of olefinically unsaturated alcohols with epoxy resins based on bisphenol A/epichlorohydrin also proved possible in spite of the low polymerization temperatures which the presence of the blocked vinyl isocyanate monomers demands.

The present invention relates to a surface-coating binder based on a copolymer which contains carboxyl groups, blocked isocyanate groups, hydroxyl groups and ether groups and which, due to partial or complete salification with ammonia or with an organic base, is water-soluble or water-dispersible, and wherein the copolymer contains, as copolymerized units:

(A) one or more $\alpha,\beta$-olefinically unsaturated carboxylic acids of 3 to 5 carbon atoms or a half-ester of an $\alpha,\beta$-olefinically unsaturated dicarboxylic acid of 3 to 5 carbon atoms, (B) from 10 to 35% by weight of an N(1-alkenyl) isocyanate blocked with a CH—, OH— or NH-acidic blocking agent, (C) from 20 to 50% by weight of an adduct of an epoxy resin, based on bisphenol A and epichlorohydrin and having a molecular weight of from 380 to 3,500, with an olefinically unsaturated alcohol of 3 to 20 carbon atoms, and (D) from 5 to 64% by weight of one or more copolymerizable olefinically unsaturated compounds not already mentioned under (A) to (C)

with the provisos that the copolymer has a mean molecular weight of from 1,000 to 20,000 and contains component (A), as copolymerized units, in an amount such that the acid number of the copolymer is from 35 to 150 mg of KOH/g, and that the sum of the percentages of (A) to (D) is 100.

The invention further relates to the use of the surface-coating binder as a self-crosslinking binder or, in combination with a polyfunctional crosslinking agent, as an externally crosslinking binder, for the anodic electrocoating of metallic articles.

The novel binders which are suitable for anodic electrocoating essentially consist of copolymers having a mean molecular weight of from 1,000 and 20,000, the proportion of copolymerized olefinically unsaturated carboxyl-containing compound A being chosen so that the copolymer has an acid number of from 35 to 150 mg of KOH/g of copolymer, and the proportion of copolymerized units of component (B) in the copolymer being from 10 to 35% by weight.

The electrocoating composition prepared from the novel copolymer in general contains from 7 to 20% by weight of an ammonium salt or amine salt of the said copolymer.

The novel surface-coating binders conform to the requirements stated above and in particular exhibit substantial improvements in respect of the anti-corrosion properties and chemical resistance of the coatings obtained.

The following details are to be noted regarding the constituents of the novel binder:

(A) Suitable components (A) are $\alpha,\beta$-olefinically unsaturated monocarboxylic acids and dicarboxylic acids of 3 to 5 carbon atoms, e.g. acrylic acid, methacrylic acid, maleic acid, fumaric acid and itaconic acid, as well as half-esters of $\alpha,\beta$-olefinically unsaturated dicarboxylic acids, of 3 to 5 carbon atoms, with $C_1$–$C_8$-alkanols, e.g. monoesters of maleic acid, fumaric acid and itaconic acid, and mixtures of the above. Particularly preferred components (A) are acrylic acid and methacrylic acid.

Component (A) is present as copolymerized units in the novel copolymer in amounts such that the acid number of the copolymer is from 35 to 150, preferably from 35 to 100 (mg of KOH/g of copolymer).

(B) Component (B) is an adduct of an N-(1-alkenyl) isocyanate and a CH-, OH- or NH-acidic blocking agent. Suitable N-(1-alkenyl) isocyanates are those where alkenyl is of 2 to 4 carbon atoms, preferably vinyl isocyanate and/or propenyl isocyanate. Examples of suitable blocking agents for the preparation of component (B) are monophenols, e.g. phenol, cresol and trimethylphenol, primary and secondary alcohols, e.g. isopropanol and cyclohexanol, tertiary alcohols, e.g. t-butanol and t-amyl alcohol, easily enolizable compounds, e.g. ethyl acetoacetate, acetylacetone, malonic acid derivatives, e.g. diesters of malonic acid with alcohols of 1 to 8 carbon atoms, and malonodinitrile, secondary aromatic amines, e.g. N-methylaniline, N-methyltoluidine and N-phenyltoluidine, imides, e.g. succinimide and phthalimide, lactams, e.g. ε-caprolactam, δ-valerolactam and lauryllactam, oximes, e.g. acetone-oxime, butanone-oxime and cyclohexanone-oxime, and aromatic triazoles, e.g. triazabenzene. Particularly preferred blocking agents of the N-(1-alkenyl) isocyanates are t-butanol, cyclohexanol, ε-caprolactam and triazabenzene.

The blocked N-(1-alkenyl) isocyanate, e.g. the blocked vinyl isocyanate, can be prepared, for example, by a method similar to that given in Houben-Weyl, Methoden der organischen Chemie, Volume 14/2 (1963), 61–70. Preferably, the preparation is carried out in the presence of a solvent. The reaction of the N-(1-alkenyl) isocyanate (vinyl isocyanate) with the blocking agent is carried out with about equimolar amounts. An excess of isocyanate is to be avoided, since it might subsequently cause crosslinking.

The novel copolymer contains from 10 to 35, preferably from 15 to 25, % by weight of component (B) as copolymerized units.

(C) Component (C) is a reaction product of an epoxy resin of bisphenol A and epichlorohydrin, having a molecular weight of from 380 to 3,500 and preferably containing about 2 epoxide groups per molecule, with an olefinically unsaturated alcohol of 3 to 20 carbon atoms, for example allyl alcohol, geraniol, but-1-en-3-ol, farnesol, soybean alcohol, linseed oil alcohol or with a hydroxyalkyl allyl ether and hydroxyalkyl allyl thioether of 2 to 6 carbon atoms in the alkanol radical, e.g. allyl hydroxypropyl ether and allyl hydroxyethyl thioether, the reaction product of the epoxy resin with the unsaturated alcohol being preferably free from epoxide groups. The preferred molecular weight of the epoxy resin, before reaction with the alcohol, is from 380 to 1,400. A particularly preferred substance is the reaction product of such an epoxy resin, having a mean molecular weight of about 900, with allyl alcohol or but-1-en-3-ol.

The novel copolymer contains from 20 to 50, preferably from 25 to 50, % by weight of component (C) as copolymerized units.

(D) Suitable components (D) are copolymerizable olefinically unsaturated compounds not already mentioned under (A) to (C), such as esters of acrylic acid or methacrylic acid with monoalcohols of 1 to 18, preferably of 1 to 8, carbon atoms, e.g. methyl acrylate, ethyl acrylate, butyl acrylate, ethylhexyl acrylate and methyl methacrylate. Any other copolymerizable unsaturated compounds may also be used, especially vinyl esters of carboxylic acids of 1 to 10 carbon atoms, e.g. vinyl acetate, vinyl propionate and vinyl pivalate, vinyl-aromatics, e.g. styrene, acrylonitrile and olefinically unsaturated triglycerides, e.g. isomerized linseed oil, as well as mixtures of the said monomers.

The novel copolymer contains from 5 to 64, preferably from 15 to 60, % by weight of component (D) as copolymerized units.

Advantageously, the novel copolymers are prepared in polar solvents devoid of OH groups, such as ethers, e.g. tetrahydrofuran, esters, e.g. ethyl acetate or methylglycol acetate, aromatic hydrocarbons, e.g. xylene or toluene, or mixtures of these solvents, in the presence of free radical initiators, e.g. azo-bis-carboxamides, azo-bis-carboxylic acid nitriles, or peroxides, in general at from 50° to 120° C., preferably from 60° to 90° C., and in the presence or absence of a regulator, e.g. t-dodecylmercaptan or diisopropylxanthogen disulfide.

Examples of particularly preferred binders are copolymers of from 6 to 12% by weight of acrylic acid or methacrylic acid, from 20 to 25% by weight of vinyl isocyanate blocked with caprolactam, from 25 to 50% by weight of a reaction product of an epoxy resin, obtained from bisphenol A and epichlorohydrin and having a mean molecular weight of about 900, with allyl alcohol, and from 13 to 49% by weight of component (D), e.g. 2-ethylhexyl acrylate or butyl acrylate.

An equivalence ratio of the reactive hydrogens of component (C) to the blocked isocyanate groups of component (B) of about 1:1 is preferred.

The novel copolymers are non-crosslinked products having a molecular weight of from 1,000 to 20,000, preferably from 2,000 to 10,000 (measured by a vapor pressure osmometer). The K values (determined by the Fikentscher method on a 3% strength solution in acetone) are correspondingly from 15 to 35, preferably from 16 to 20.

The novel copolymers contain free carboxyl groups, blocked isocyanate groups and structures which are reactive toward isocyanate groups, and may or may not contain carbon-carbon double bonds, which on baking the surface coatings contribute to the crosslinking.

According to the invention, these copolymers are used as surface-coating binders and are water-soluble or water-dispersible through partial or complete salification with ammonia or organic bases.

For such salification, the copolymers are partially or completely neutralized with ammonia or an amine. The latter may be one of the amines or diamines conventionally used as a neutralizing agent for aqueous coating compositions and electrocoating compositions. Diisopropanolamine and dimethylethanolamine are preferred. The degree of neutralization required for the use of the novel surface-coating binders in an aqueous medium is in general from 30 to 100%.

In addition to the novel binder, the surface-coating composition can contain polyfunctional cross-linking agents, such as relatively high molecular weight hydroxyl-containing and/or carboxyl-containing polycondensates, polyadducts and/or polymers, e.g. aminoplasts or phenol-formaldehyde resins, as well as pigments, e.g. titanium dioxide, talc and carbon black, in amounts which, depending on the application, are from 10 to 60, preferably from 20 to 50, parts by weight per 100 parts by weight of binder. Furthermore, it may contain inorganic and organic colored pigments in amounts of up to 5 parts by weight and fillers, again in amounts of up to 5 parts by weight. Furthermore, up to 10 parts of a leveling agent, up to 10 parts of a wax to increase the scratch resistance, and up to 2 parts of a catalyst for the unblocking reaction, e.g. dibutyl-tin dilaurate, may be present per 100 parts of binder.

The novel surface-coating binders are used in particular for anodic electrocoating, either as self-crosslinking binders or as binders requiring an external crosslinking agent.

The novel electrocoating finishes may in particular be used to coat metallic articles, for example consisting of iron, steel or aluminum.

The anionic electrocoating baths are prepared in a conventional manner, for example as described in W. Machu, Elektrotauchlackierung, 163 et seq. The solids content of the electrocoating baths is in general from 8 to 15% by weight and the pH from 7.2 to 9.5. The coatings obtained using the novel binders are very hard, very resilient and resistant to chemicals, and provide good protection from corrosion. Aging of the bath does not have an adverse effect on the said good properties.

In the Examples which follow, parts and percentages are by weight, unless stated otherwise.

Preparation of component (B)

(B1) tert.-Butyl N-vinylcarbamate 69 parts of vinyl isocyanate and 70 parts of ethyl acetate are introduced into a reaction vessel equipped with a high-efficiency condenser (employing cooling brine), stirrer, thermometer and feed vessel. 74 parts of tert.-butanol, 73 parts of ethyl acetate and 0.01% of dibutyl-tin dilaurate are added in the course of 1 hour at 40° C. The reaction is then allowed to continue for 10 hours at 40° C. A pale yellow clear solution results. Blocked isocyanate content: 14.7%.

(B2) Cyclohexyl N-vinylcarbamate 69 parts of vinyl isocyanate and 89.5 parts of ethyl acetate are introduced into a reaction vessel and heated to 40° C. A mixture of 110 parts of cyclohexanol and 89.5 parts of ethyl acetate (containing 0.02% of dibutyl-tin dilaurate as catalyst) is added in the course of 1 hour. The mixture is then allowed to react for 2 hours at 40° C. A pale yellow solution is obtained, from which the reaction product crystallizes out on cooling. Blocked isocyanate content: 11.7%.

(B3) Vinyl isocyanate/caprolactam adduct 113 parts of ε-caprolactam and 91 parts of ethyl acetate (+0.015% of dibutyl-tin dilaurate) are introduced into a reaction vessel and the mixture is heated to about 50° C. A mixture of 69 parts of vinyl isocyanate and 91 parts of ethyl acetate is then added dropwise in the course of 1 hour, after which the mixture is allowed to react for 5 hours. A pale yellow clear solution is obtained. Blocked isocyanate content: 11.5%.

Preparation of component (C)

250 parts of an epoxy resin obtained from bisphenol A and epichlorohydrin and having a mean molecular weight of 900 and an epoxide value of 0.2–0.223, and 400 parts of allyl alcohol, are mixed and heated at 80° C. until a homogeneous solution has formed. 1.75 parts of boron trifluoride diethyl etherate solution, 75 parts of allyl alcohol and 0.1 part of hydroquinone monomethyl ether are added. After refluxing for two hours, the excess alcohol is distilled off and the product is taken up in ethyl acetate. A clear yellowish solution having an epoxide value of 0.00 and a solids content of 61% is obtained.

Preparation of the copolymer solutions

Polymer 1

100 parts of feed I are introduced into a reaction vessel equipped with a stirrer, reflux condenser and internal thermometer. Feed I consists of 104 parts of adduct B 2 solution, 124 parts of component (C), 56 parts of ethylhexyl acrylate, 4 parts of 2,2′-azo-bis-(2,4-dimethyl-valeronitrile) and 3 parts of t-dodecylmercaptan. Feed II consists of 12 parts of acrylic acid and 37 parts of ethyl acetate. The initial charge is heated to 70° C. Feeds I and II are introduced in the course of 3 hours at 70° C. and polymerization is then continued for one hour. A further 0.5% of initiator is then added and polymerization is again continued, until the conversion is 100%. A clear solution of a resin, having a K value of 18, is obtained, the solids content being 58.2%. The acid number is 59.7.

Polymer 2

96 parts of adduct B 3 solution (in place of adduct B 2), 109 parts of component (C), 60 parts of butyl acrylate, 8 parts of styrene and 14 parts of methacrylic acid are copolymerized by the method described for polymer 1. The polymer has a K value of 16.6 and an acid number of 50.1, and the solids content of the solution is 61.6%.

Polymer 3

64 parts of component (C), 120 parts of adduct B 2 solution, 80 parts of butyl acrylate and 20 parts of acrylic acid are copolymerized as described for polymer 1. The polymer solution has a solids content of 50.4%, and the polymer has a K value of 17.6 and an acid number of 78.3.

Polymer 4

82 parts of component (C), 80 parts of adduct B 3 solution, 20 parts of acrylonitrile, 50 parts of ethylhexyl acrylate, 20 parts of isomerized linseed oil (for example Ilinol 104) and 20 parts of acrylic acid are copolymerized as described for polymer 1. The polymer solution has a solids content of 63.3%, and the polymer has a K value of 16 and an acid number of 65.5.

Comparative polymer 1

70 parts of adduct B 3 solution, 25 parts of hydroxypropyl acrylate, 30 parts of ethylhexyl acrylate, 4 parts of styrene and 6 parts of methacrylic acid are copolymerized as described for polymer 1. The polymer solution has a solids content of 71%, and the polymer has a K value of 28 and an acid number of 36.5.

Comparative polymer 2

56 parts of component (C), 10 parts of acrylonitrile, 45 parts of ethylhexyl acrylate and 10 parts of acrylic acid are copolymerized as described for polymer 1. The polymer solution has a solids content of 53% and the polymer has a K value of 20.8 and an acid number of 73.5.

Electrocoating compositions

Electrocoating composition 1

2 parts of dibutyl-tin dilaurate and 6.63 parts of dimethylethanolamine are added to 167.5 parts of polymer solution 1. A 10% strength dispersion is prepared with fully demineralized water and is used for the anodic electrocoating of zinc-phosphatized steel sheet for a period of 2 minutes at a coating voltage of 200 V. The coatings are rinsed with fully demineralized water, blown dry with compressed air and baked for 30 minutes at 220° C.

Electrocoating composition 2

1.4 parts of dibutyl-tin dilaurate and 5.33 parts of dimethylethanolamine are added to 117.3 parts of polymer solution 1 and 44 parts of a commercial bisphenol A/formaldehyde resin (solids content 68%). A 10% strength aqueous dispersion is prepared. Zinc-phosphatized steel sheet is coated anodically at 100 V, and the coatings are baked for 30 minutes at 220° C.

Electrocoating composition 3

19 parts of a 50% strength aqueous solution of diisopropanolamine are added to 163.3 parts of polymer solution 2. A 10% strength dispersion is prepared with fully demineralized water and is used for the anodic coating of zinc-phosphatized steel sheet at 80 V; the coating is then baked for 30 minutes at 190° C.

Electrocoating composition 4

13.4 parts of 50% strength aqueous diisopropanolamine solution are added to 113.6 parts of polymer solution 2 and 44 parts of the bisphenol A/formaldehyde resin used in electrocoating composition 2. A 10% strength dispersion is prepared with fully demineralized water and is used for the anodic coating of zinc-phosphatized steel sheet at 150 V; the coating is then baked for 30 minutes at 190° C.

Electrocoating composition 5

6.67 parts of dimethylethanolamine are added to 198.4 parts of polymer solution 3. A 10% strength dispersion is prepared with fully demineralized water and is used for the anodic coating of zinc-phosphatized steel sheet at 50 V; the coating is then baked for 30 minutes at 170° C.

Electrocoating composition 6

6.93 parts of dimethylethanolamine are added to 158.7 parts of polymer solution 3 and 19.4 parts of the bisphenol A/formaldehyde resin of electrocoating composition 2. A 10% strength dispersion is prepared with fully demineralized water and is used for the anodic coating of zinc-phosphatized steel sheet at 150 V; the coating is then baked for 30 minutes at 170° C.

Electrocoating composition 7

3 parts of dimethylethanolamine are added to 125 parts of polymer solution 4 and 36.8 parts of the bisphenol A/formaldehyde resin of electrocoating composition 2. A 10% strength dispersion is prepared with fully demineralized water and is used for the anodic coating of zinc-phosphatized steel sheet at 140 V; the coating is then baked for 30 minutes at 180° C.

Electrocoating composition 8 (Comparative Example without polyether)

16.7 parts of 50% strength aqueous diisopropanolamine solution are added to 140.8 parts of the polymer solution of comparative polymer 1. A 10% strength dispersion is prepared with fully demineralized water and is used for the anodic coating of zinc-phosphatized steel sheet at 100 V; the coating is then baked for 30 minutes at 170° C.

Electrocoating composition 9 (Comparative Example without isocyanate monomer)

8.0 parts of dimethylethanolamine are added to 188.7 parts of the polymer solution of comparative polymer 2. A 10% strength dispersion is prepared with fully demineralized water and is used for the anodic coating of zinc-phosphatized steel sheet at 250 V; the coating is then baked for 30 minutes at 170° C.

The properties of the surface coatings obtained by using the electrocoating compositions 1 to 9 are summarized in the Table.

TABLE

| Electrocoating composition No. | Properties of the electrocoatings | | | | | | | | |
|---|---|---|---|---|---|---|---|---|---|
| | 1 | 2 | 3 | 4 | 5 | 6 | 7 | 8 | 9 |
| Coating thickness [μm] | 16 | 15 | 8 | 11 | 11 | 26 | 11 | 30 | 16 |
| Pendulum hardness [sec] (DIN 53,157) | 141 | 140 | 143 | 185 | 135 | 135 | 160 | 130 | 61 |
| Erichsen deep-drawing value [mm] (DIN 53,156) | 10 | 4.3 | 10 | 8.5 | 9.4 | 3.1 | 6.5 | 2 | 9 |
| Acetone resistance | i o | i o | i o | i o | i o | i o | i o | i o | n i o |
| Corrosion protection (DIN 50,021) | 240 h: 6 mm | 240 h: 9 mm | 168 h: 8 mm | 168 h: 7 mm | 168 h: 8 mm | 168 h: 4 mm | 240 h: 11 mm | 24 h: 8 mm | 168 h: 8 mm | i o = in order
n i o = not in order

We claim:
1. A surface-coating binder based on a copolymer which contains carboxyl groups, blocked isocyanate groups, hydroxyl groups and ether groups and which, due to partial or complete salification with ammonia or with an organic base, is water-soluble or water-dispersible, wherein the copolymer contains, as copolymerized units:
(A) one or more α,β-olefinically unsaturated carboxylic acids of 3 to 5 carbon atoms or a half-ester of an α,β-olefinically unsaturated dicarboxylic acid of 3 to 5 carbon atoms,
(B) from 10 to 35% by weight of an N(1-alkenyl) isocyanate blocked with a CH-, OH- or NH-acidic blocking agent,
(C) from 20 to 50% by weight of an adduct of an epoxy resin, based on bisphenol A and epichlorohydrin and having a molecular weight of from 380 to 3,500, with an olefinically unsaturated alcohol of 3 to 20 carbon atoms, and

(D) from 5 to 64% by weight of one or more copolymerizable olefinically unsaturated compounds not already mentioned under (A) to (C)

with the provisos that the copolymer has a mean molecular weight of from 1,000 to 20,000 and contains component (A), as copolymerized units, in an amount such that the acid number of the copolymer is from 35 to 150 mg of KOH/g, and that the sum of the percentages of (A) to (D) is 100.

2. A surface-coating binder as claimed in claim 1, wherein the ratio of the number of equivalents of reactive hydrogens of component (C) to the number of equivalents of blocked isocyanate groups in the copolymer is about 1:1.

3. A surface-coating binder as claimed in claim 1, wherein component (B) is an adduct of vinyl isocyanate or propenyl isocyanate and cyclohexanol, tert.-butanol, triazabenzene or $\epsilon$-caprolactam, in the molar ratio of isocyanate to blocking agent of 1:1.

4. A surface-coating binder as claimed in claim 1, wherein the copolymer contains acrylic acid or methacrylic acid as component (A), vinyl isocyanate blocked with caprolactam as component (B), a reaction product of an epoxy resin, obtained from bisphenol A and epichlorohydrin and having a mean molecular weight of about 900, with allyl alcohol, as component (C), and 2-ethylhexyl acrylate or butyl acrylate as component (D), the said components being present as copolymerized units.

5. A process for the anodic electrocoating of metallic articles, wherein a surface-coating binder as claimed in claim 1 is used as a self-crosslinking binder.

6. A process for the anodic electrocoating of metallic articles, wherein a surface-coating binder as claimed in claim 1 is used in combination with a polyfunctional crosslinking agent.

7. A process as claimed in claim 6, wherein the polyfunctional crosslinking agent is a hydroxyl-containing or carboxyl-containing polycondensate, polyadduct or polymer, of relatively high molecular weight.

8. A process as claimed in claim 6, wherein the polyfunctional crosslinking agent is an aminoplast or a phenol-formaldehyde resin.

* * * * *